(12) United States Patent
McCallum et al.

(10) Patent No.: US 11,916,780 B2
(45) Date of Patent: *Feb. 27, 2024

(54) VARIABLE LINK AGGREGATION

(71) Applicant: Redline Communications Inc., Markham (CA)

(72) Inventors: Ian McCallum, Innisfil (CA); Bogdan Barna, North York (CA); Andrew Spurgeon, Newmarket (CA)

(73) Assignee: Aviat U.S., Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,956

(22) Filed: Nov. 28, 2022

(65) Prior Publication Data

US 2023/0088112 A1 Mar. 23, 2023

Related U.S. Application Data

(63) Continuation of application No. 16/946,661, filed on Jun. 30, 2020, now Pat. No. 11,558,284.

(51) Int. Cl.
*H04L 47/34* (2022.01)
*H04L 45/24* (2022.01)
(Continued)

(52) U.S. Cl.
CPC ........ *H04L 45/245* (2013.01); *H04L 47/2483* (2013.01); *H04L 47/34* (2013.01);
(Continued)

(58) Field of Classification Search
CPC ... H04L 45/245; H04L 47/2483; H04L 47/34; H04L 47/41; H04L 49/9057; G06K 9/6267; H04W 8/04
See application file for complete search history.

(56) References Cited

U.S. PATENT DOCUMENTS 6,650,640 B1 * 11/2003 Muller ................ H04L 49/9063
370/473
7,006,500 B1 * 2/2006 Pedersen ................ H04L 45/00
370/395.54

(Continued)

FOREIGN PATENT DOCUMENTS

| WO | 2016162804 A1 | 10/2016 |
| WO | 2019034587 A1 | 2/2019 |
| WO | 2019204311 A1 | 10/2019 |

*Primary Examiner* — Wutchung Chu
(74) *Attorney, Agent, or Firm* — Stratford Group Ltd.

(57) ABSTRACT

A system and method to transmit frames from a first node to a second node over a plurality of radio links comprising a classifier to classify said frames according to one of a plurality of flow and a sequence number within said one of said plurality of flow and adding said flow and sequence number in a header of said classified frame a splitter receiving said classified frames from said classifier and distributing said classified frames on one of said plurality of radio links for transmission to said second node, a joiner receiving said classified frames and reordering them using an indexed sequence queue corresponding to each of said plurality of flows, a timer for waiting for frames missing in the sequence in one of said indexed sequence queue, wherein when said timer expires, if said frame has not arrived it is deemed lost and a forwarder to extract frames from said sequence queue to forward.

18 Claims, 6 Drawing Sheets

(51) Int. Cl.
  *H04L 47/41* (2022.01)
  *H04L 47/2483* (2022.01)
  *H04L 49/9057* (2022.01)
  *G06F 18/24* (2023.01)

(52) U.S. Cl.
  CPC .............. *H04L 47/41* (2013.01); *G06F 18/24* (2023.01); *H04L 49/9057* (2013.01)

(56) References Cited

U.S. PATENT DOCUMENTS

| | | |
|---|---|---|
| 11,240,157 B1* | 2/2022 | Callaghan ................ H04L 69/22 |
| 11,451,494 B2* | 9/2022 | Frankel ................ H04L 47/2483 |
| 2004/0062198 A1* | 4/2004 | Pedersen .............. H04M 11/062 370/229 |
| 2007/0041385 A1* | 2/2007 | Sali ....................... H04L 47/621 370/230 |
| 2009/0010259 A1* | 1/2009 | Sirotkin .............. H04L 47/2441 370/392 |
| 2010/0188977 A1* | 7/2010 | Rochon ................. H04L 69/161 370/235 |
| 2010/0246396 A1 | 9/2010 | Licardie et al. |
| 2011/0107059 A1* | 5/2011 | Oh ........................ G06F 9/5027 712/18 |
| 2014/0247721 A1* | 9/2014 | Arisoylu ............. H04L 41/0896 370/235 |
| 2016/0323186 A1* | 11/2016 | Dillon ..................... H04L 67/02 |
| 2017/0247721 A1 | 8/2017 | Yacyshyn et al. |
| 2019/0044878 A1* | 2/2019 | Steffen .................... H04L 47/34 |
| 2019/0342785 A1* | 11/2019 | Li ......................... H04L 47/624 |
| 2019/0044791 A1 | 12/2019 | Hourtane et al. |
| 2020/0236043 A1* | 7/2020 | Sze .................... H04L 43/0882 |

* cited by examiner

VARIABLE LINK AGGREGATION

CROSS REFERENCE TO RELATED APPLICATIONS

This application is a continuation of U.S. patent application Ser. No. 16/946,661, filed Jun. 30, 2020, now allowed, which is hereby incorporated by reference in its entirety.

FIELD OF INVENTION

The present disclosure relates to a variable link aggregation, more specifically but not by way of limitation, a system and method for splitting traffic across multiple network links to increase overall throughput.

BACKGROUND

Link aggregation is a widely used, even standardized (e.g., IEEE 802.3ad) technique that splits traffic across multiple network links to increase overall throughput.

Wireless radio equipment is used to construct layer 2 (L2) Ethernet networks in harsh environments where there is little or no existing infrastructure (e.g., oil fields, mines). One property of an unmanaged L2 network is that frames from a source endpoint to its destination endpoint are always delivered in the same order as they are received. In L2 networks that support Quality of Service (QoS), Ethernet frames are classified at ingress and assigned a flow identifier. Frames with a particular flow identifier are delivered in order, but traffic in one flow may be reordered with respect to traffic in other flows. For example, traffic might be classified into high and low priority flows. All high priority traffic is sent in order, and all low priority traffic is sent in order, but high priority traffic is always to be prioritized over low priority traffic. Reordering frames between flows is considered acceptable.

A side-effect of transmitting flows in order, is that a single flow is not split across multiple links. This limits the maximum throughput of a single flow to that of a single link. This can be mitigated somewhat by considering more header fields from L3 (or even L4) in the classifier, but the mapping from single flow to single link limitation remains. When backhauling, LTE core traffic is wrapped in the GPRS Tunneling Protocol (GTP) which makes traffic appear as a single flow. As a result, standard link aggregation algorithms do not work for LTE backhaul traffic.

BRIEF SUMMARY

It is the object of the present invention to provide a variable link aggregation. A system to transmit frames from a first node to a second node over a plurality of radio links comprising a classifier to classify the frames according to one of a plurality of flow and a sequence number within the one of the plurality of flow and adding the flow and sequence number in a header of the classified frame. A splitter receiving the classified frames from the classifier and distributing the classified frames on one of the plurality of radio links for transmission to the second node. A joiner receiving the classified frames and reordering them using an indexed sequence queue corresponding to each of the plurality of flows. A timer for waiting for frames missing in the sequence in one of the indexed sequence queue, wherein when the timer expires, if the frame has not arrived it is deemed lost and a forwarder to extract frames from the sequence queue to forward.

In accordance with an aspect of the invention, there is provided a method to transmit frames from a first node to a second node over a plurality of radio links comprising classifying the frames according to one of a plurality of flow and a sequence number within the one of the plurality of flow and adding the flow and sequence number in a header of the classified frame. Receiving the classified frames from the classifier and distributing the classified frames on one of the plurality of radio links for transmission to the second node. Receiving the classified frames, at the second node, and reordering them using one of a plurality of indexed sequence queue corresponding to each of the plurality of flows. Waiting, using a timer, for frames missing in the sequence in one of the indexed sequence queue, wherein when the timer expires, if the frame has not arrived it is deemed lost and extracting the frames from the sequence queue to transmit on a radio link.

In accordance with an embodiment of the invention, the joiner adds a flow identifier to a flow queue upon reception of the classified frames and the forwarder extracts the flow identifier from the flow queue to select which sequence queue to extract the next frame.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

Figure 1:
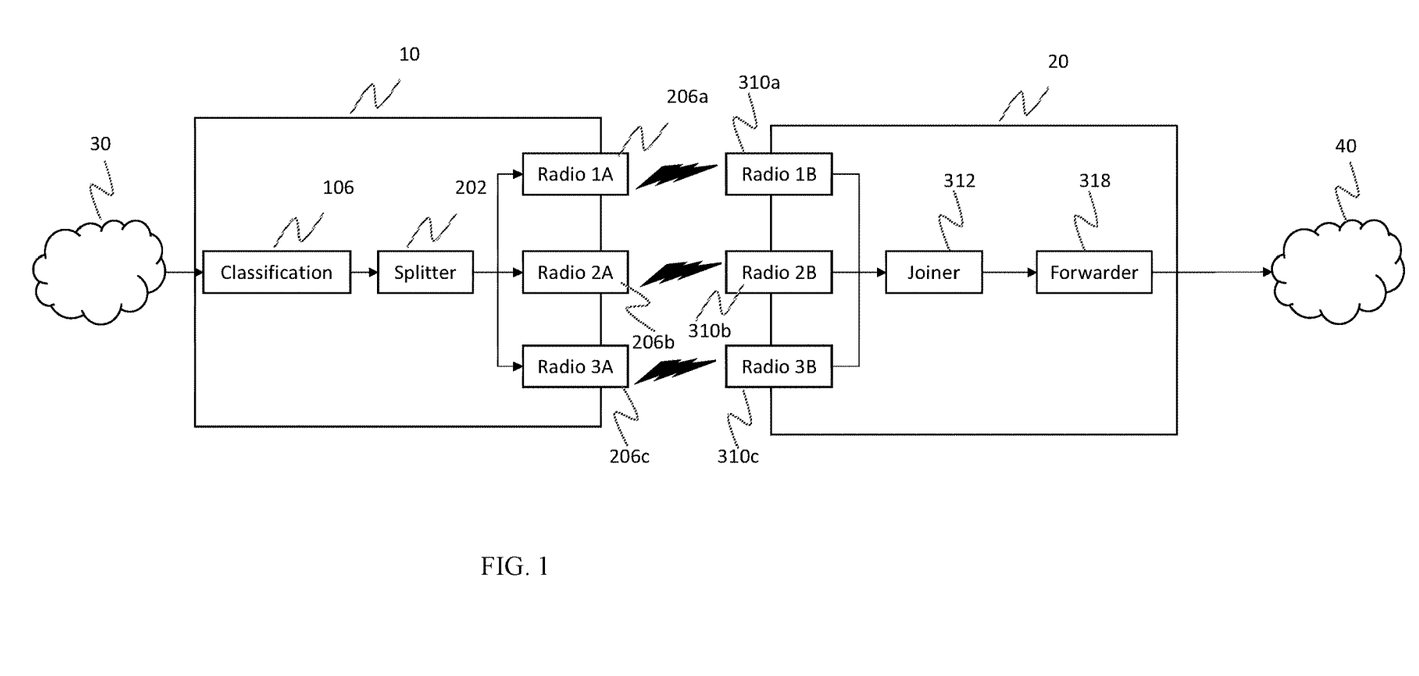
FIG. 1 illustrates a wireless network with variable link aggregation.

FIG. 1 depicts an example embodiment. A first network node 10 receive frames from a network 30. The network 30 may be wired or wireless or a combination thereof. The frames are classified 106 then split across multiple radio transmitters 206a, 206b, 206c for transmission to another node 20. The frames are received at radio receivers 310a, 310b, 310c. They are then joined and sequenced 312 before being forwarded 318 to a network 40.

In one embodiment, the traffic from a single flow is split across multiple links. This introduces the possibility that individual frames in the single flow arrive out of order at the remote node 20. This embodiment optimally splits traffic from a single flow (or multiple flows) across multiple variable speed wireless links and recombines it efficiently at the remote side so proper flow ordering is maintained while still providing predictable Quality of Service (QoS).

Figure 2:
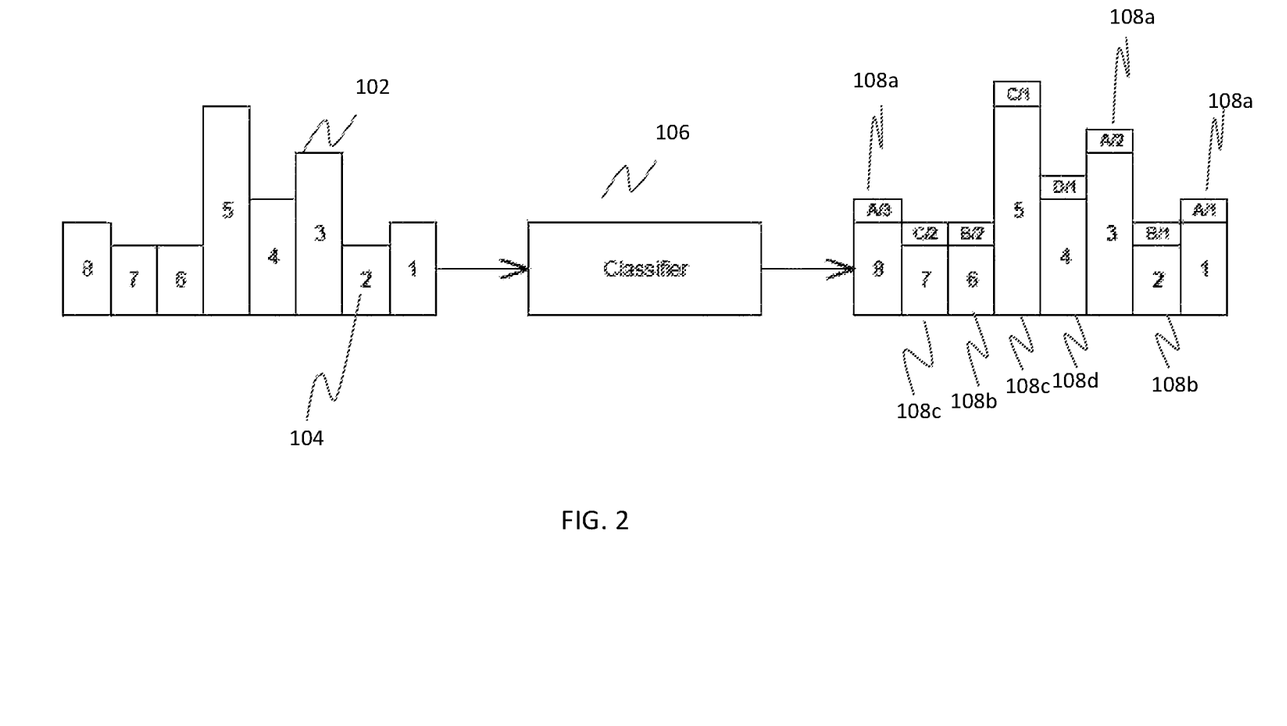
FIG. 2 illustrates an example of frames being classified

FIG. 2 depicts an example of how the frames are classified in preparation for splitting on several links. Frames 102 ready to be transmitted on a radio link arrive at a classifier 106. The size of the box 102 exemplifies a relative size of the frames 102. The number in the box is the arrival sequence number 104 of the frame. The classifier processes the headers to determine the flow identifier of each frame (F) a sequence identifier (S) is also added to each frame 102. In this example, there are four flows 108a, 108b, 108c, 108d. And each flow has one or more frames arriving in a sequence. In this example, frame #1, #3 and #8 belong to flow A (108a) The flow identifier (F) a sequence identifier (S) is added to each header 110. In this example, "A/1" indicates the first frame of flow A, "A/2" the second frame in flow A.

Figure 3:
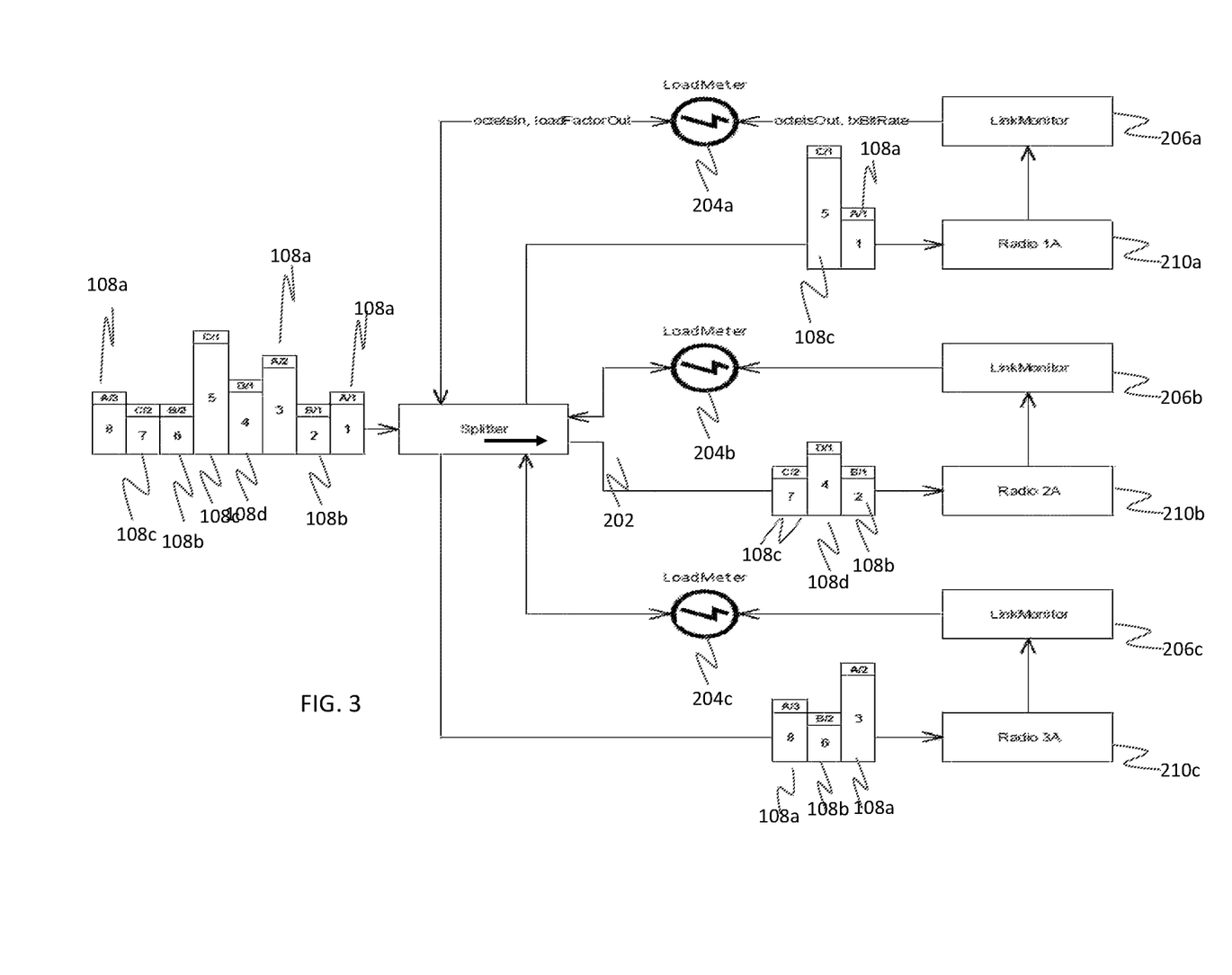
FIG. 3 illustrates an embodiment where frames are split onto multiple links.

FIG. 3 depicts classified frames arriving at a splitter 202. The splitter 202 checks the load factor 204a, 204b, 204c of each radio channel that would result if the current frame was sent to that channel. Then picks the least loaded channel to forward the frame. Calculating the load factor by including the current frame is optional but can improve latency because smaller frames can be sent on radio links 210a, 210b, 210c with fastest transmission bit rate (all else being equal). The link monitor 206a, 206b, 206c monitors the radio 210a, 210b, 210c and update the load meter 204a, 204b, 204c parameters dynamically. If the link goes down, the transmit bit rates goes to zero and the load factor is set to infinity.

Figure 4:
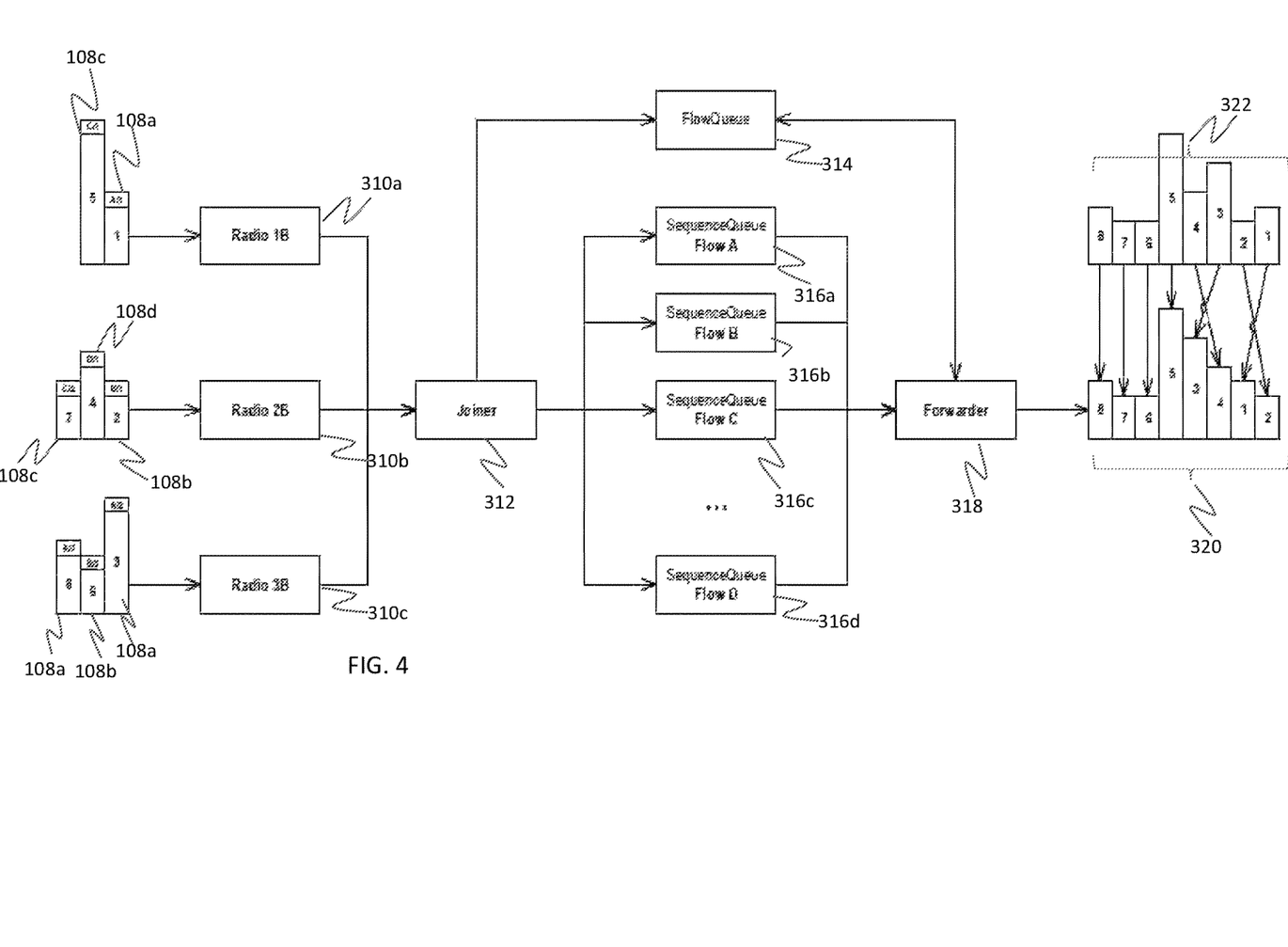
FIG. 4 illustrates an embodiment where frames are combined from the multiple links.

FIG. 4 depicts the receive and reassembly side implemented on the receiving radio 310a, 310b, 310c. A joiner function 312 reads frames from radios on a first come first serve basis. It extracts the flow identifier (F) a sequence identifier (S) from each header, then directs the frames to the appropriate sequence queue 316a, 316b, 316c, 316d based on the flow identifier (F) and slots into each queue based on the sequence identifier (S). A sequence queue is a slotted queue that holds frames indexed by sequence identifier (S). The queues handle out of order and dropped frames using timers.

In a preferred embodiment, the flow identifier is optionally placed in a Flow Queue 314. A forwarder 318 reads the flow identifier at the top of the flow queue 314 and uses it to access the appropriate sequence queue to read from. If there is no frame at the head (dropped or out of order) then the flow identifier is requeued in the flow queue and a timer is started for this flow queue. If a frame is available at the head of the sequence queue, the forwarder reads the frame and forwards it, and if the timer was previously started, it is reset. If there is no frame at the head and the timer has expired, then the forwarder assumes this frame is lost and advances to the next frame in the queue.

The frames exit the forwarder 320 in the right order with respect to their specific flow but can be reordered with respect to other flows and the original frame arrival 322 which does not create an issue.

Figure 5:
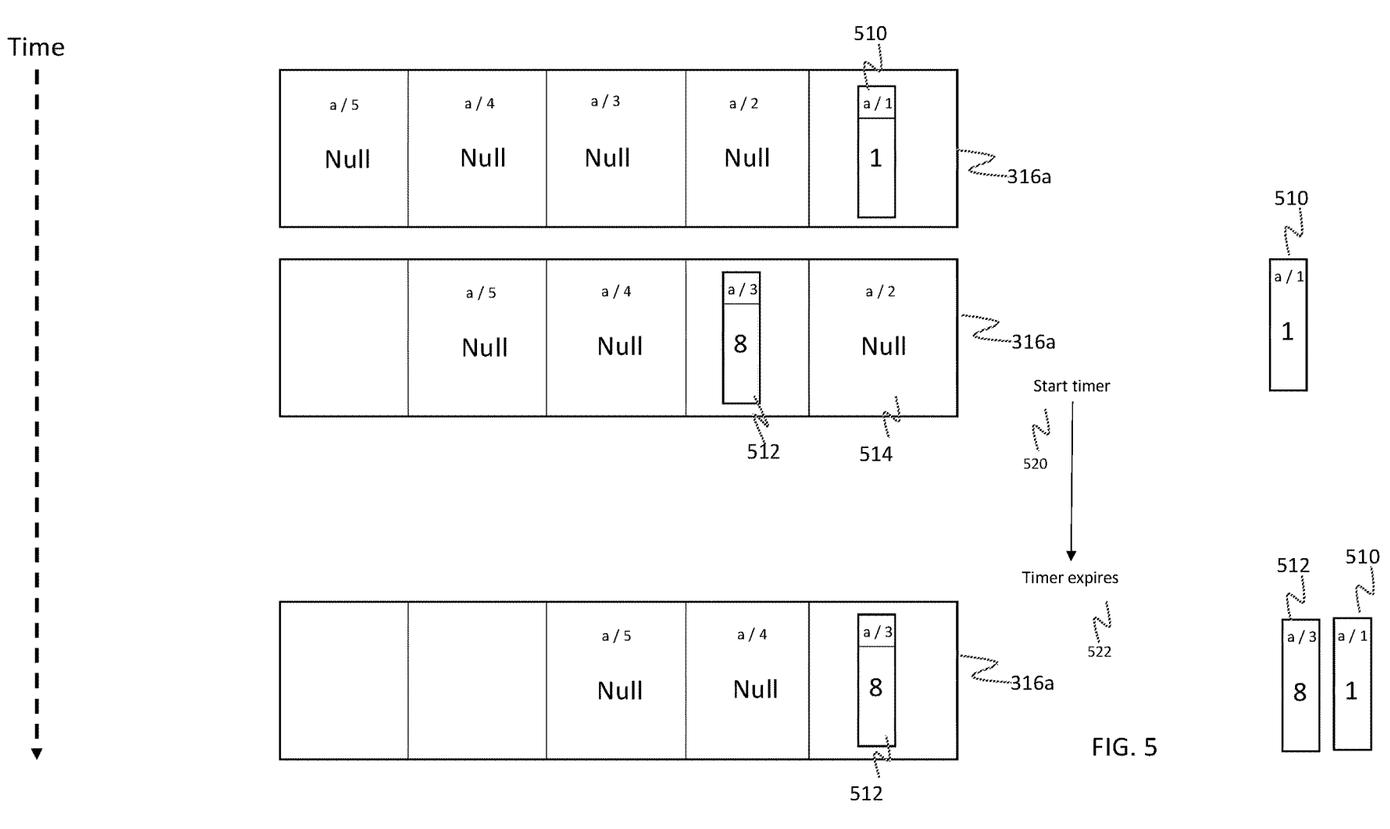
FIG. 5 illustrates an example of the frame reordering embodiment.

FIG. 5 illustrates an example of the frame arrival in sequence queue A and the process to reorder the frames. In this example the frame for flow A 316a with the first sequence number arrives first 510 and the joiner places the frame in the sequence queue and puts A into the flow queue 314. Then the frame with the $3^{rd}$ sequence number arrives next 512, before the $2^{nd}$. The joiner places the third frame in its location in the sequence queue and puts another A in the flow queue 314. The space for the second frame remains empty 514. When the forwarder reads A from the flow queue 314, it reads the first frame 510 and transmits it. The next time the forwarder reads A in the flow queue 314, it sees an empty ("NULL") 514 entry in the sequence queue 316b, a timer 520 is started and the forwarder reinserts A back into the flow queue 314. When the forwarder reads A again from the flow queue 314, if the timer expired, packet #2 of the flow A is deemed lost and the forwarder reads and transmits the next packet 512.

Figure 6:
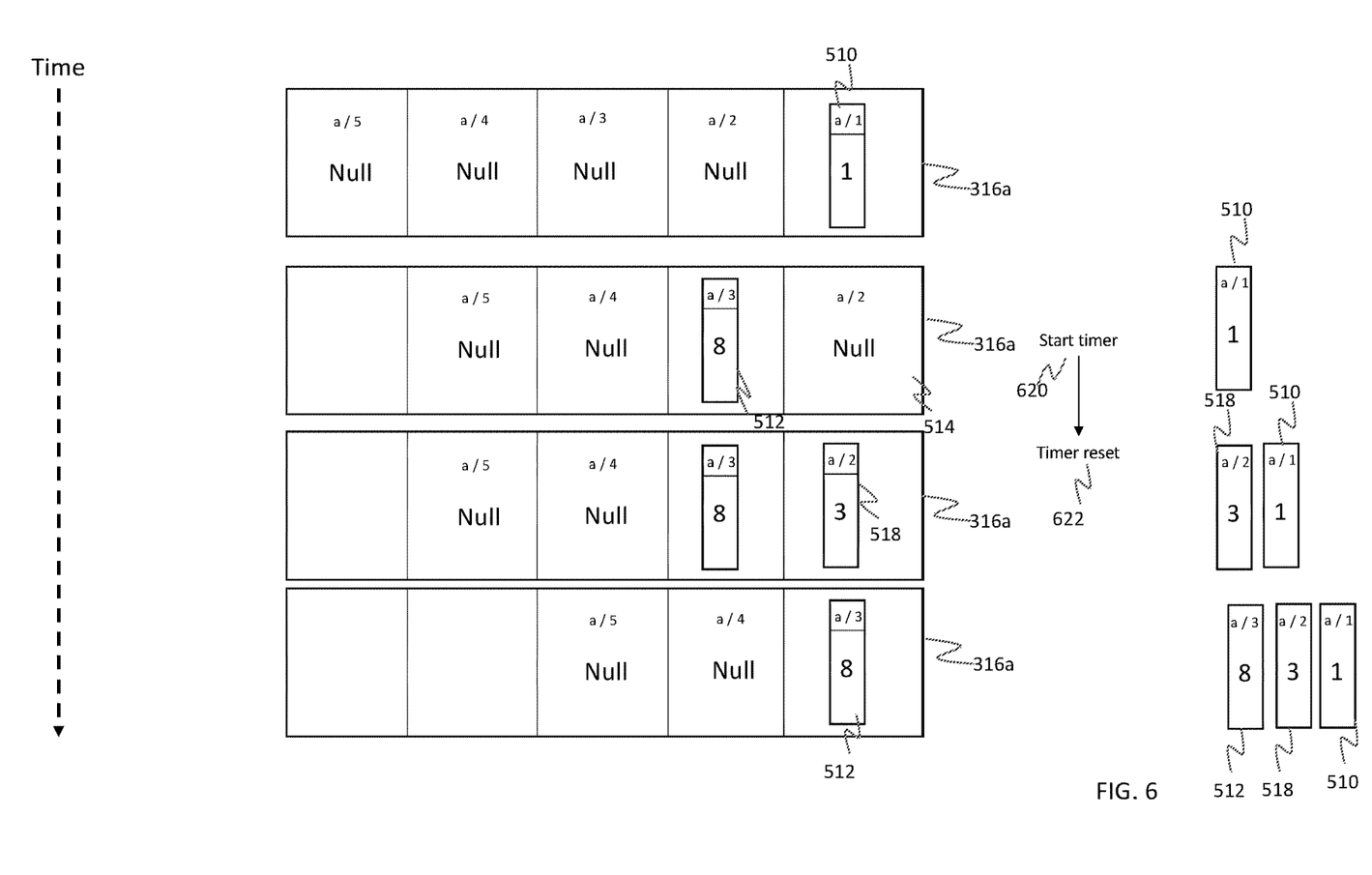
FIG. 6 illustrates another example of the frame reordering embodiment.

FIG. 6 illustrates another example of the frame arrival a sequence queue 316a and the process to reorder the frames. In this example the frame for flow A with the first sequence number arrives first 510 and the joiner places the frame in the sequence queue and puts A in the flow queue 314. Then the frame with the $3^{rd}$ sequence number arrives next 512, before the $2^{nd}$. The third frame is placed in its location in the sequence queue and the joiner puts another A in the flow queue 314 and the space for the second frame remains empty 514.

When the forwarder reads A from the flow queue 314, it reads the first frame 510 and transmits it. The next time the forwarder reads A from the flow queue 314, it sees an empty slot ("NULL") 514 entry in the sequence queue 316b, a timer 520 is started and the forwarder reinserts A back into the flow queue 314. When the forwarder reads A again from the flow queue 314, packet #2 518 has arrived and the forwarder reads and transmits it, then resets the timer.

There are a limited number of sequence numbers and the system can use a modulo function to wrap around the number. For example, using 8 bits, there can be 256 sequence numbers (0-255).

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A network system comprising:
a first network node including:
one or more receivers for receiving from a second network node a plurality of frames of a single flow over respective one or more links;
a joiner configured to, for each received frame of the single flow, with use of a flow identifier and a sequence identifier stored in the received frame, store in a memory store an indication of receipt of the received frame of the single flow and insert the received frame in an indexed sequence queue for the single flow at a position within the indexed sequence queue indexed based on the sequence identifier and such that entries in the indexed sequence queue corresponding to frames which have not been received remain empty; and
a forwarder configured to, with use of the indications of receipts of the received frames of the single flow, extract from the indexed sequence queue, the received plurality of frames of the single flow.

2. The network system of claim 1, wherein the forwarder, in its configuration to extract from the indexed sequence queue the received plurality of frames, is further configured to:
- determine that a received frame of the single flow is to be removed from the indexed sequence queue from a presence of an indication of the receipt of a received frame of the single flow in the memory store,
- at a time subsequent to said determining, extract a received frame from an expected position within the indexed sequence queue, and
- remove the indication of the receipt of the received frame of the single flow from the memory store.

3. The network system of claim 1, wherein the forwarder, in its configuration to extract from the indexed sequence queue the received plurality of frames, is further configured to:
- determine that a received frame of the single flow is to be removed from the indexed sequence queue from a presence of an indication of the receipt of a received frame of the single flow in the memory store,
- determine that the received frame is absent from the expected position within the indexed sequence queue,
- wait for a time limit according to a timer for the received frame to be inserted into the expected position within the indexed sequence queue,
- after the time limit has expired, determine a frame corresponding to the expected position has been lost,
- extract a received frame from a next expected position within the indexed sequence queue, and
- remove the indication of the receipt of the received frame of the single flow from the memory store.

4. The network system of claim 1, wherein the memory store comprises a flow queue, and the indications of receipts of the received frames of the single flow comprise flow identifiers stored in said flow queue.

5. The network system of claim 1, wherein the forwarder, in its configuration to extract from the indexed sequence queue, the received plurality of frames of the single flow, is further configured to:
- extract the flow identifier from the flow queue, and after extracting the flow identifier from the flow queue, if a next entry of the indexed sequence queue for the single flow is empty, reinsert the flow identifier in the flow queue.

6. The network system of claim 5, wherein the first network node is further configured to wait, using a timer, started upon said reinsertion of the flow identifier in the flow queue, for a received frame to be inserted in the next entry in said indexed sequence queue which is empty, and wherein when said timer expires, if said entry is not occupied, a frame corresponding to said entry is deemed lost, and if said entry is occupied, the received frame occupying said entry is extracted and forwarded and the timer is reset.

7. The network system of claim 1, further comprising:
the second network node including:
- a classifier configured to, for each frame of the plurality of frames, determine that the frame belongs to the single flow and determine a sequence number for the frame within the single flow, insert the flow identifier and the sequence identifier into said frame, and distribute the frame on one of said one or more links for transmission; and
- one or more transmitters for transmitting said plurality of frames from the second network node to the first node over the respective one or more links.

8. The network system of claim 7, further comprising a splitter configured to distribute each of said plurality of frames on one of said one or more links for transmission, including checking load factors of the one or more links and selecting said one of said one or more links for transmission with use of said load factors.

9. The network system of claim 8, wherein checking the load factors of the one or more links comprises determining the load factors taking into account a size of the frame being distributed.

10. A method of receiving frames in a network system, the method comprising:
- at a first network node, receiving from a second network node a plurality of frames of a single flow over one or more links;
- for each received frame of the single flow, with use of a flow identifier and a sequence identifier stored in the received frame, storing in a memory store an indication of receipt of the received frame of the single flow and inserting the received frame in an indexed sequence queue for the single flow at a position within the indexed sequence queue indexed based on the sequence identifier and such that entries in the indexed sequence queue corresponding to frames which have not been received remain empty; and
- extracting from the indexed sequence queue, the received plurality of frames of the single flow, with use of the indications of receipts of the received frames of the single flow.

11. The method of claim 10, wherein extracting from the indexed sequence queue the received plurality of frames comprises:
- determining that a received frame of the single flow is to be removed from the indexed sequence queue from a presence of an indication of the receipt of a received frame of the single flow in the memory store,
- at a time subsequent to said determining, extracting a received frame from an expected position within the indexed sequence queue, and
- removing the indication of the receipt of the received frame of the single flow from the memory store.

12. The method of claim 10, wherein extracting from the indexed sequence queue the received plurality of frames further comprises:
- determining that a received frame of the single flow is to be removed from the indexed sequence queue from a presence of an indication of receipt of a received frame of the single flow in the memory store,
- determining that the received frame is absent from an expected position within the indexed sequence queue,
- waiting for a time limit according to a timer for the received frame to be inserted into the expected position within the indexed sequence queue,
- after the time limit has expired, determining a frame corresponding to the expected position has been lost,
- extracting a received frame from a next expected position within the indexed sequence queue, and
- removing the indication of the receipt of the received frame of the single flow from the memory store.

13. The method of claim 10, wherein the memory store comprises a flow queue, and the indications of receipts of the received frames of the single flow comprise flow identifiers stored in said flow queue.

14. The method of claim 10, wherein extracting from the indexed sequence queue, the received plurality of frames of the single flow comprises extracting the flow identifier from the flow queue, and after extracting the flow identifier from the flow queue, if a next entry of the indexed sequence queue for the single flow is empty, the flow identifier is reinserted in the flow queue.

15. The method of claim 14, further comprising waiting, using a timer, started upon said reinsertion of the flow identifier in the flow queue, for a received frame to be inserted in the next entry in said indexed sequence queue which is empty, and wherein when said timer expires, if said entry is not occupied, a frame corresponding to said entry is deemed lost, and if said entry is occupied, the received frame occupying said entry is extracted and forwarded and the timer is reset.

16. The method of claim 10, further comprising:
   at the second network node, for each frame of the plurality of frames, determining that the frame belongs to the single flow and determining a sequence number for the frame within the single flow, inserting the flow identifier and the sequence identifier into said frame, and distributing the frame on one of said one or more links for transmission; and
   transmitting said plurality of frames from the second network node to the first network node over the one or more links.

17. The method of claim 16, wherein distributing each of said frames on one of said one or more links for transmission, comprises checking load factors of the one or more links and selecting said one of said one or more links for transmission with use of said load factors.

18. The method of claim 17, wherein checking the load factors of the one or more links, comprises determining the load factors taking into account a size of the frame being distributed.

* * * * *